United States Patent
Yamamoto

(10) Patent No.: US 10,559,985 B2
(45) Date of Patent: Feb. 11, 2020

(54) WIRELESS POWER TRANSFER SYSTEM, CONTROL METHOD OF WIRELESS POWER TRANSFER SYSTEM, WIRELESS POWER TRANSMITTING APPARATUS, CONTROL METHOD OF WIRELESS POWER TRANSMITTING APPARATUS, AND STORAGE MEDIUM

(71) Applicant: CANON KABUSHIKI KAISHA, Tokyo (JP)

(72) Inventor: Tetsuya Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/167,368

(22) Filed: Oct. 22, 2018

(65) Prior Publication Data
US 2019/0058361 A1 Feb. 21, 2019

Related U.S. Application Data

(63) Continuation of application No. 15/634,966, filed on Jun. 27, 2017, now Pat. No. 10,158,260, which is a
(Continued)

(30) Foreign Application Priority Data

Nov. 4, 2010 (JP) .................................. 2010-247842

(51) Int. Cl.
*H02J 50/80* (2016.01)
*H02J 7/00* (2006.01)
(Continued)

(52) U.S. Cl.
CPC ............ *H02J 50/80* (2016.02); *H02J 7/0021* (2013.01); *H02J 7/0047* (2013.01); *H02J 7/025* (2013.01);
(Continued)

(58) Field of Classification Search
CPC .. H02J 50/80; H02J 50/10; H02J 50/40; H02J 7/0021; H02J 7/0047; H02J 7/025;
(Continued)

(56) References Cited

U.S. PATENT DOCUMENTS

| 5,032,975 A | 7/1991 | Yamamoto et al. |
| 5,136,222 A | 8/1992 | Yamamoto et al. |

(Continued)

FOREIGN PATENT DOCUMENTS

| JP | 6-133476 A | 5/1994 |
| JP | 7-241045 A | 9/1995 |

(Continued)

OTHER PUBLICATIONS

Japanese Office Action dated Sep. 30, 2016 in corresponding Japanese Application No. 2015-254765. (Previously cited during prosecution of parent U.S. Appl. No. 15/634,966.).

(Continued)

*Primary Examiner* — Robert L Deberadinis
(74) *Attorney, Agent, or Firm* — Venable LLP

(57) ABSTRACT

A wireless power transfer system comprising a wireless power transmitting apparatus and a plurality of wireless power receiving apparatuses, the wireless power transmitting apparatus comprising: a power transmitting unit adapted to transmit power to the wireless power receiving apparatus; a recognition unit adapted to recognize the wireless power receiving apparatus; and a transmitting unit adapted to transmit predetermined charging delay information according to a recognition result of the recognition unit to the wireless power receiving apparatus recognized by the recognition unit, and the wireless power receiving apparatus comprising: a power receiving unit adapted to receive power transmitted from the power transmitting unit; a receiving unit adapted to receive the predetermined charging delay (Continued)

information transmitted from the transmitting unit; and a display unit adapted to make a display based on the predetermined charging delay information received by the receiving unit.

16 Claims, 12 Drawing Sheets

Related U.S. Application Data continuation of application No. 14/990,761, filed on Jan. 7, 2016, now Pat. No. 9,722,434, which is a continuation of application No. 14/500,271, filed on Sep. 29, 2014, now Pat. No. 9,270,125, which is a continuation of application No. 13/246,823, filed on Sep. 27, 2011, now Pat. No. 8,884,471.

(51) Int. Cl.
*H02J 7/02* (2016.01)
*H02J 7/04* (2006.01)
*H02J 50/40* (2016.01)
*H02J 50/10* (2016.01)

(52) U.S. Cl.
CPC .............. *H02J 7/041* (2013.01); *H02J 7/042* (2013.01); *H02J 50/10* (2016.02); *H02J 50/40* (2016.02); *H02J 2007/005* (2013.01); *H02J 2007/0049* (2013.01); *Y10T 307/25* (2015.04)

(58) Field of Classification Search
CPC .... H02J 7/041; H02J 7/042; H02J 2007/0049; H02J 2007/005; H02J 7/00; H02J 7/02; H02J 7/04; Y10T 307/25
See application file for complete search history.

(56) References Cited

U.S. PATENT DOCUMENTS

| | | | |
|---|---|---|---|
| 6,078,663 A | 6/2000 | Yamamoto | |
| 6,597,790 B1 | 7/2003 | Yamamoto | |
| 7,071,865 B2 | 7/2006 | Shibamiya et al. | |
| 7,296,234 B2 | 11/2007 | Fukuda et al. | |
| 7,496,278 B2 | 2/2009 | Miyamoto et al. | |
| 7,522,087 B2 | 4/2009 | Shibamiya et al. | |
| 7,937,346 B2 | 5/2011 | Kato et al. | |
| 8,008,888 B2 | 8/2011 | Oyobe et al. | |
| 8,023,802 B2 | 9/2011 | Miyamoto et al. | |
| 8,198,858 B2 | 6/2012 | Kim | |
| 8,884,471 B2 | 11/2014 | Yamamoto | |
| 2009/0140690 A1 | 6/2009 | Jung | |
| 2009/0160424 A1 | 6/2009 | Yamamoto | |
| 2010/0213895 A1 | 8/2010 | Keating | |
| 2011/0191568 A1 | 8/2011 | Yamamoto | |

FOREIGN PATENT DOCUMENTS

| | | |
|---|---|---|
| JP | 7-298505 | 11/1995 |
| JP | 8-019189 A | 1/1996 |
| JP | 2001-169466 | 6/2001 |
| JP | 2001-211480 | 8/2001 |
| JP | 2004-072193 A | 3/2004 |
| JP | 2005-117827 | 4/2005 |
| JP | 2007-089341 A | 4/2007 |
| JP | 2008-017592 A | 1/2008 |
| JP | 2009-136132 A | 6/2009 |
| JP | 3151047 U | 6/2009 |
| JP | 2009-148151 | 7/2009 |
| JP | 2010-88158 | 4/2010 |
| JP | 2010-175492 A | 8/2010 |
| JP | 2010-178498 A | 8/2010 |
| JP | 2010-183706 A | 8/2010 |
| WO | 2009-054221 A1 | 4/2009 |

OTHER PUBLICATIONS

Japanese Office Action dated Mar. 19, 2018 in Japanese Application No. 2017115391. (Previously cited during prosecution of parent U.S. Appl. No. 15/634,366.).

Japanese Office Action dated Apr. 11, 2019 in corresponding Japanese Application No. 2018-141610 (with machine generated English language translation).

F I G. 1
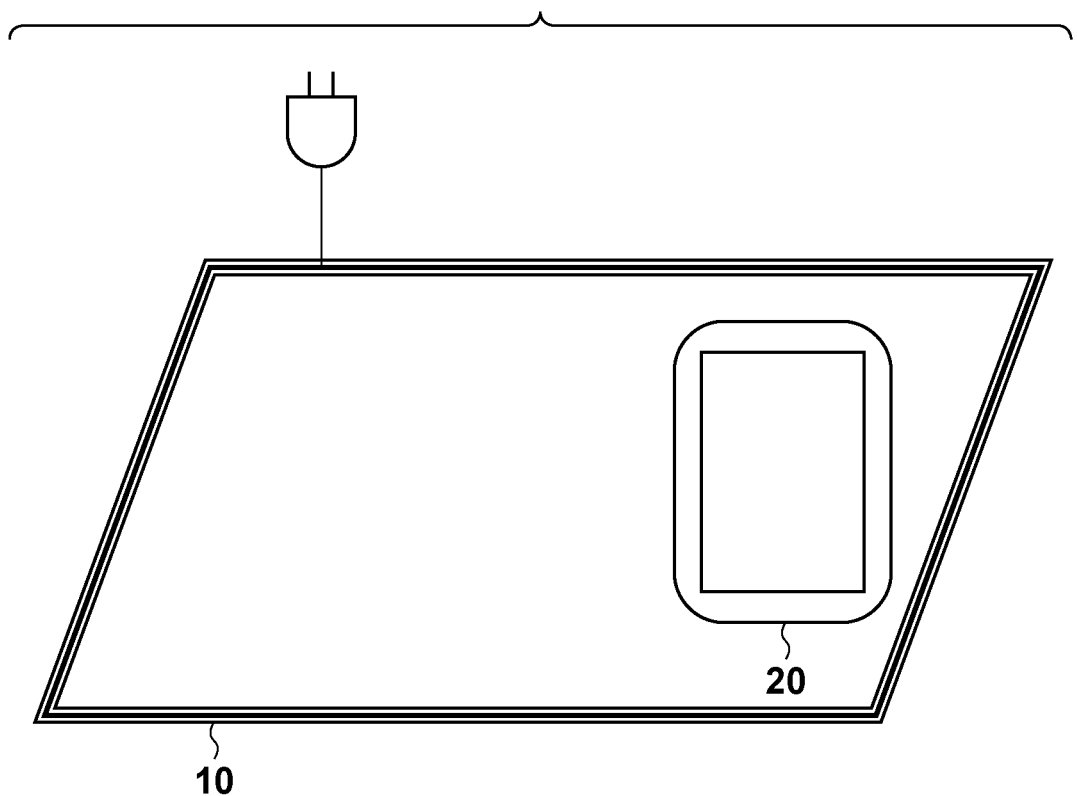

F I G. 6
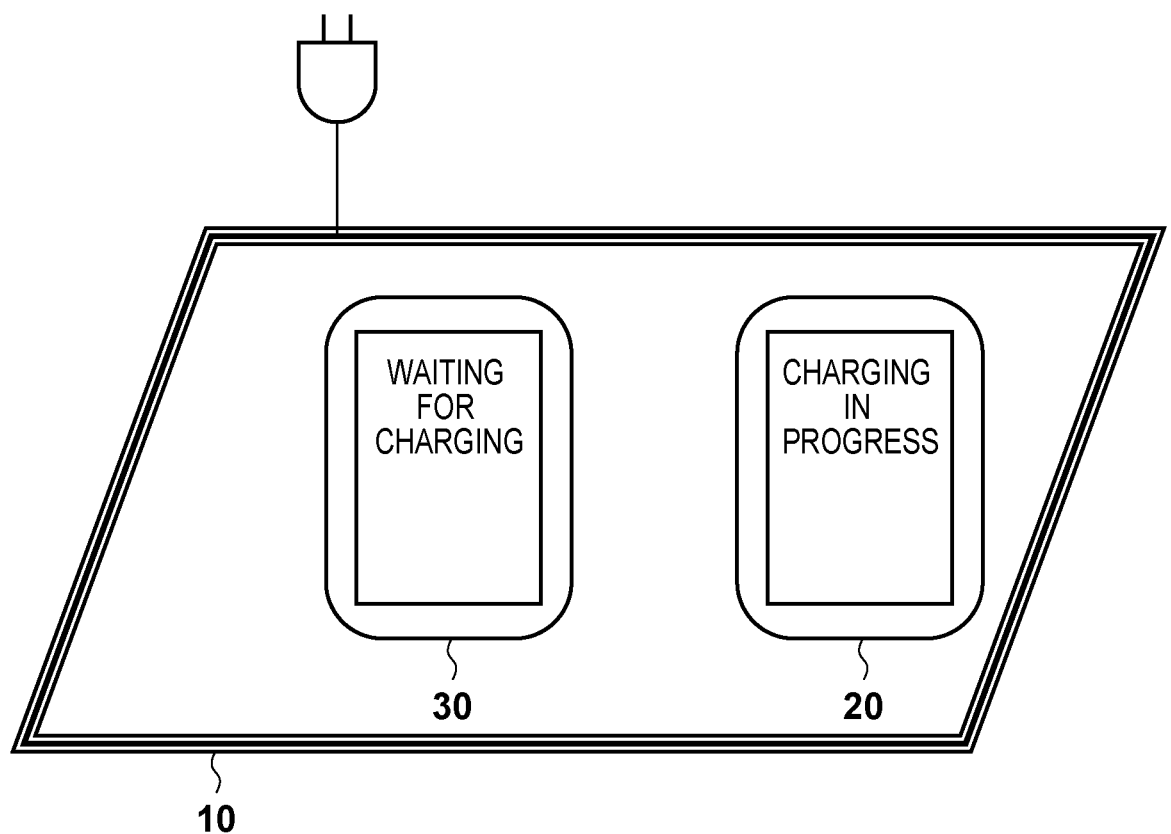

WIRELESS POWER TRANSFER SYSTEM, CONTROL METHOD OF WIRELESS POWER TRANSFER SYSTEM, WIRELESS POWER TRANSMITTING APPARATUS, CONTROL METHOD OF WIRELESS POWER TRANSMITTING APPARATUS, AND STORAGE MEDIUM

This application is a continuation of U.S. application Ser. No. 15/634,966, filed Jun. 27, 2017, which is a continuation of U.S. application Ser. No. 14/990,761, filed Jan. 7, 2016 (now U.S. Pat. No. 9,722,434, issued on Aug. 1, 2017), which is a continuation of U.S. application Ser. No. 14/500,271, filed Sep. 29, 2014 (now U.S. Pat. No. 9,270,125, issued on Feb. 23, 2016), which is a continuation of U.S. patent application Ser. No. 13/246,823, filed Sep. 27, 2011 (now U.S. Pat. No. 8,884,471, issued on Nov. 11, 2014), the contents of each of which is incorporated herein by reference.

BACKGROUND OF THE INVENTION

Field of the Invention

The present invention relates to a wireless power transfer system for a plurality of apparatuses, a control method of the wireless power transfer system, a wireless power transmitting apparatus, a control method of the wireless power transmitting apparatus, and a storage medium.

Description of the Related Art

In recent years, apparatuses such as cellular phones which use rechargeable batteries are popularly used. A system for charging a rechargeable battery is configured by a primary-side apparatus which transmits power to the rechargeable battery, and a secondary-side apparatus which receives power.

In such a charging system, a technique for displaying a charging state of a rechargeable battery on the primary side is available (Japanese Patent Laid-Open No. 8-019189). Also, a technique for displaying a charging state of a rechargeable battery on a secondary-side apparatus is available (Japanese Patent Laid-Open No. 7-241045).

Furthermore, a technique for transferring power to a plurality of apparatuses using electromagnetic induction or electromagnetic resonance is available (Japanese Patent Laid-Open No. 2008-017592, U.S. Patent Application Publication No. 2009/0140690). Moreover, a wireless power transfer technique, which communicates so as to supply power to a secondary-side apparatus that uses a different voltage or current, is available (Japanese Patent Laid-Open No. 6-133476).

However, in a wireless charging system which can wirelessly charge a plurality of secondary-side apparatuses, the power transmitting capability of a primary-side apparatus has an upper limit specified by that wireless charging system.

On the other hand, in the wireless charging system, a restriction about the position of the secondary-side apparatus during charge is relatively moderate because the primary-side apparatus and secondary-side apparatus need not be connected. For this reason, there is a case that a predetermined number or more of secondary-side apparatuses are located within a wirelessly chargeable region and not charged wirelessly over the power transmitting capability of the primary-side apparatus.

In this case, the following phenomena may occur. That is, the charging times of the respective secondary-side apparatuses may be prolonged, and a specific secondary-side apparatus may not be charged. However, with the conventional technique, since the user does not receive any information indicating that such phenomena have occurred, he or she cannot judge whether or not the phenomena have occurred due to a trouble of the primary-side apparatus or secondary-side apparatus.

When a secondary-side apparatus of a electromagnetic resonance system is set to be closer to a primary-side apparatus of an electromagnetic induction system, since their wireless power transfer systems are different, the primary-side apparatus never transmits power to the secondary-side apparatus. The user is not able to judge whether a specific secondary-side apparatus cannot receive power due to a different wireless power transfer system or it cannot receive power since the power transmitting capability of the primary-side apparatus does not wirelessly charge that apparatus.

The present invention provides, in consideration of the above problems, a technique which allows the user to recognize the reasons why a charging time delay phenomenon and a non-charging phenomenon have occurred at the time of wireless power transfer.

SUMMARY OF THE INVENTION

According to one aspect of the present invention, there is provided a wireless power transfer system comprising a wireless power transmitting apparatus and a plurality of wireless power receiving apparatuses, the wireless power transmitting apparatus comprising: a power transmitting unit adapted to transmit power to the wireless power receiving apparatus; a recognition unit adapted to recognize the wireless power receiving apparatus; and a transmitting unit adapted to transmit predetermined charging delay information according to a recognition result of the recognition unit to the wireless power receiving apparatus recognized by the recognition unit, and the wireless power receiving apparatus comprising: a power receiving unit adapted to receive power transmitted from the power transmitting unit; a receiving unit adapted to receive the predetermined charging delay information transmitted from the transmitting unit; and a display unit adapted to make a display based on the predetermined charging delay information received by the receiving unit.

According to one aspect of the present invention, there is provided a control method of a wireless power transfer system comprising a wireless power transmitting apparatus and a wireless power receiving apparatus, the method comprising: in the wireless power transmitting apparatus, transmitting power to the wireless power receiving apparatus; recognizing the wireless power receiving apparatus; and transmitting predetermined charging delay information according to a recognition result in the recognizing to the wireless power receiving apparatus, and in the wireless power receiving apparatus, receiving power transmitted in the transmitting power; receiving the predetermined charging delay information transmitted in the transmitting; and making a display based on the predetermined charging delay information received in the receiving.

According to one aspect of the present invention, there is provided a wireless power transmitting apparatus for transmitting power to a wireless power receiving apparatus, comprising: a power transmitting unit adapted to transmit power to the wireless power receiving apparatus; a recognition unit adapted to recognize the wireless power receiving apparatus; and a transmitting unit adapted to transmit predetermined charging delay information according to a recognition result of the recognition unit to the wireless power receiving apparatus.

According to one aspect of the present invention, there is provided a control method of a wireless power transmitting apparatus for transmitting power to a wireless power receiving apparatus, comprising: transmitting power to the wireless power receiving apparatus; recognizing the wireless power receiving apparatus; and transmitting predetermined charging delay information according to a recognition result in the recognizing to the wireless power receiving apparatus.

Further features of the present invention will be apparent from the following description of exemplary embodiments with reference to the attached drawings.

BRIEF DESCRIPTION OF THE DRAWINGS

FIG. 1 is a view showing the configuration of a wireless power transfer system according to the first embodiment;

FIG. 6 is a view showing second output contents according to the first embodiment;

DESCRIPTION OF THE EMBODIMENTS

Figure 2:
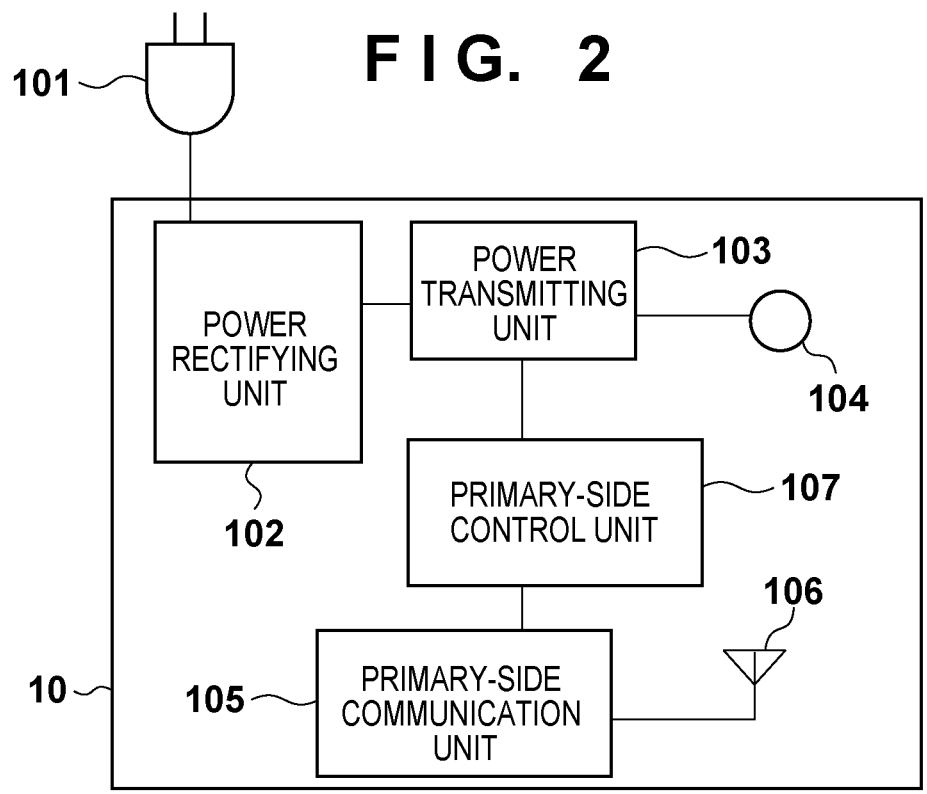
FIG. 2 is a block diagram showing the arrangement of a primary-side apparatus according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The configuration of a wireless power transfer system according to the first embodiment will be described below with reference to FIG. 1.

FIG. 1 shows a primary-side apparatus 10 (wireless power transmitting apparatus 10), a secondary-side apparatus 20 (wireless power receiving apparatus), and a secondary-side apparatus 30 (second wireless power receiving apparatus). The primary-side apparatus 10 supplies power to the secondary-side apparatuses 20 and 30.

The arrangement of the primary-side apparatus 10 will be described below with reference to FIG. 2. The primary-side apparatus 10 includes a power plug 101, power rectifying unit 102, power transmitting unit 103, primary-side coil 104, primary-side communication unit 105, primary-side antenna 106, and primary-side control unit 107. The power plug 101 is that which is connected to an outlet of an AC power supply. The power rectifying unit 102 rectifies electricity supplied from the power plug 101. The power transmitting unit 103 transmits the electricity rectified by the power rectifying unit 102. The primary-side coil 104 is that for the power transmitting unit 103. The primary-side communication unit 105 makes a data communication. The primary-side antenna 106 is that for the primary-side communication unit 105. The primary-side control unit 107 controls the power transmitting unit 103 and primary-side communication unit 105.

Figure 3:
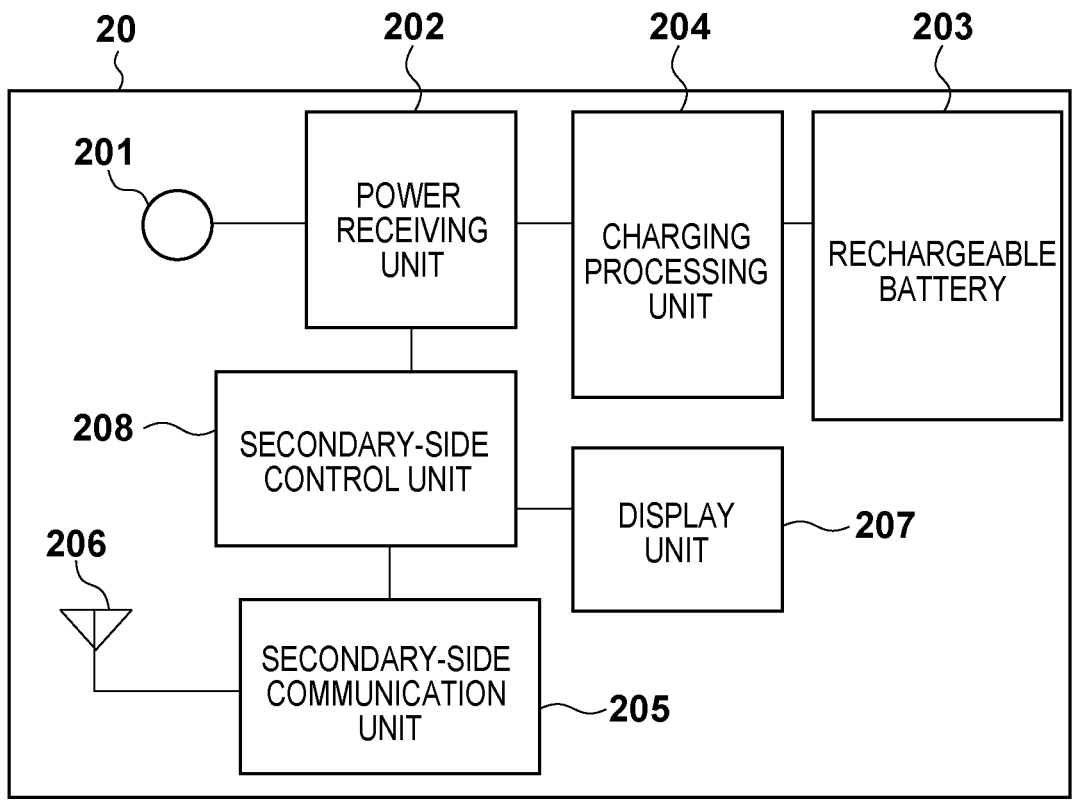
FIG. 3 is a block diagram showing the arrangement of a secondary-side apparatus according to the first embodiment.

The arrangement of the secondary-side apparatus 20 will be described below with reference to FIG. 3. The secondary-side apparatus 20 includes a secondary-side coil 201, power receiving unit 202, rechargeable battery 203, charging processing unit 204, secondary-side communication unit 205, secondary-side antenna 206, display unit 207, and secondary-side control unit 208. Note that the arrangement of the secondary-side apparatus 30 is the same as that of the secondary-side apparatus 20.

The secondary-side coil 201 receives electricity transmitted from the primary-side coil 104. The power receiving unit 202 receives the electricity from the secondary-side coil 201. The rechargeable battery 203 is that to be charged. The charging processing unit 204 supplies the electricity received by the power receiving unit 202 to the rechargeable battery 203. The secondary-side communication unit 205 makes a data communication. The secondary-side antenna 206 is that for the secondary-side communication unit 205. The display unit 207 displays information. The secondary-side control unit 208 controls the power receiving unit 202, secondary-side communication unit 205, and display unit 207.

Figure 4:
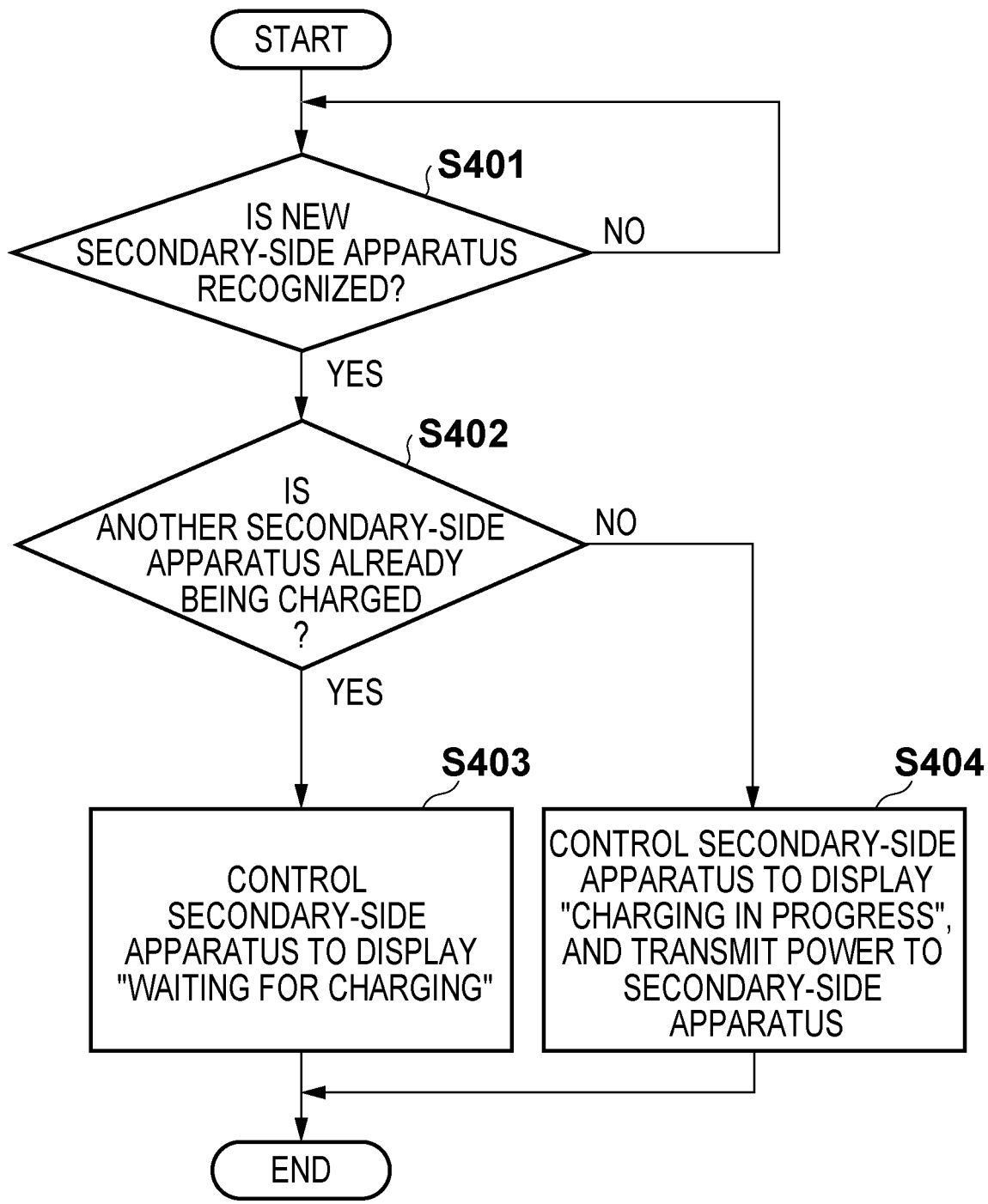
FIG. 4 is a flowchart for explaining processing of a primary-side control unit in association with charging according to the first embodiment.

The operation of the primary-side control unit 107 in association with charging by this charging system will be described below with reference to the flowchart of FIG. 4.

The primary-side control unit 107 determines in step S401 whether or not a new secondary-side apparatus is recognized. If it is determined that a new secondary-side apparatus is recognized (step S401; YES), the process advances to step S402 according to that recognition result. On the other hand, if it is determined that a new secondary-side apparatus is not recognized (step S401; NO), the process returns to step S401 according to that recognition result.

The primary-side control unit 107 determines in step S402 whether or not there is another secondary-side apparatus which is already being charged. If it is determined that there is the other secondary-side apparatus which is already being charged (step S402; YES), the process advances to step S403. On the other hand, if it is determined there is no secondary-side apparatus which is already being charged (step S402; NO), the process advances to step S404.

In step S403, the primary-side control unit 107 controls the primary-side communication unit 105 to transmit predetermined information to the secondary-side apparatus via the primary-side antenna 106. In the secondary-side apparatus, the secondary-side control unit 208 controls the secondary-side communication unit 205 to receive, via the secondary-side antenna 206, the predetermined information transmitted from the primary-side apparatus 10. Then, the secondary-side control unit 208 controls the display unit 207 according to the determination result in step S402 to display power reception waiting information indicating that the apparatus is waiting until it starts power reception.

In step S404, the primary-side control unit 107 controls the primary-side communication unit 105 to transmit predetermined information to the secondary-side apparatus via the primary-side antenna 106. The primary-side control unit 107 controls the power transmitting unit 103 to transmit power to the secondary-side apparatus via the primary-side coil 104. Then, in the secondary-side apparatus, the secondary-side control unit 208 controls the secondary-side communication unit 205 to receive, via the secondary-side antenna 206, the predetermined information transmitted from the primary-side apparatus 10. When power is transmitted from the primary-side apparatus 10 to the secondary-side apparatus, the power receiving unit 202 receives power via the secondary-side coil 201. Then, the charging processing unit 204 accumulates the received electricity in the rechargeable battery 203. The secondary-side control unit 208 controls the display unit 207 to display information indicating that charging is in progress.

Figure 5:
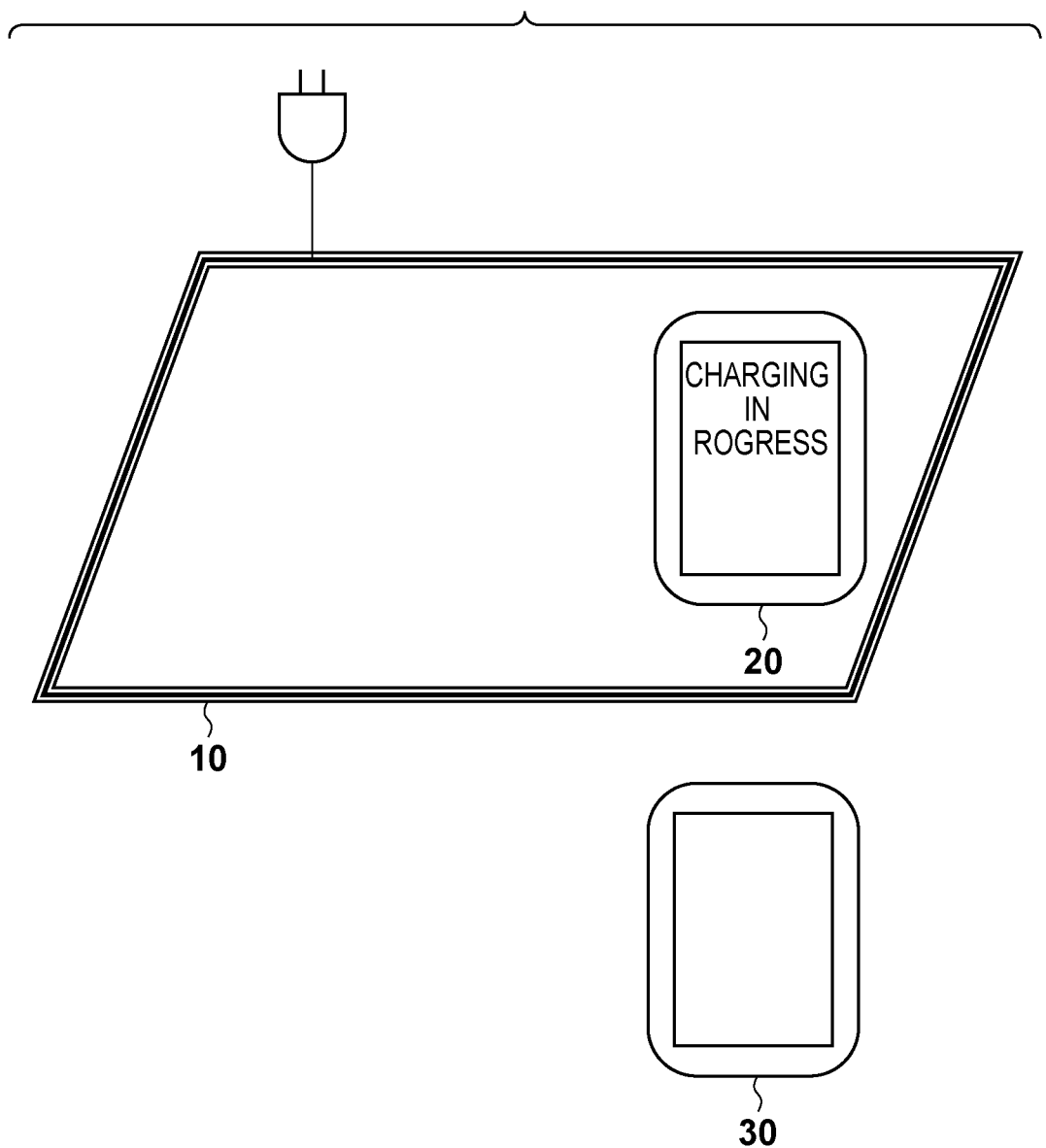
FIG. 5 is a view showing first output contents according to the first embodiment.

In this way, the processing ends. As shown in FIG. 5, when the secondary-side apparatus 20 alone is placed on a chargeable region of the primary-side apparatus 10, information indicating that charging is in progress is displayed on the secondary-side apparatus 20, and the secondary-side apparatus 20 is charged. From this state, when the secondary-side apparatus 30 is placed on the chargeable region of the primary-side apparatus 10, information indicating that the apparatus is waiting for charging is displayed on the secondary-side apparatus 30, as shown in FIG. 6.

According to this embodiment, the user of the secondary-side apparatus 30 can know the reason why the apparatus 30 is not charged, thus improving the convenience.

Second Embodiment

The configuration of a charging system according to the second embodiment is the same as that shown in FIG. 1 described in the first embodiment.

Figure 7:
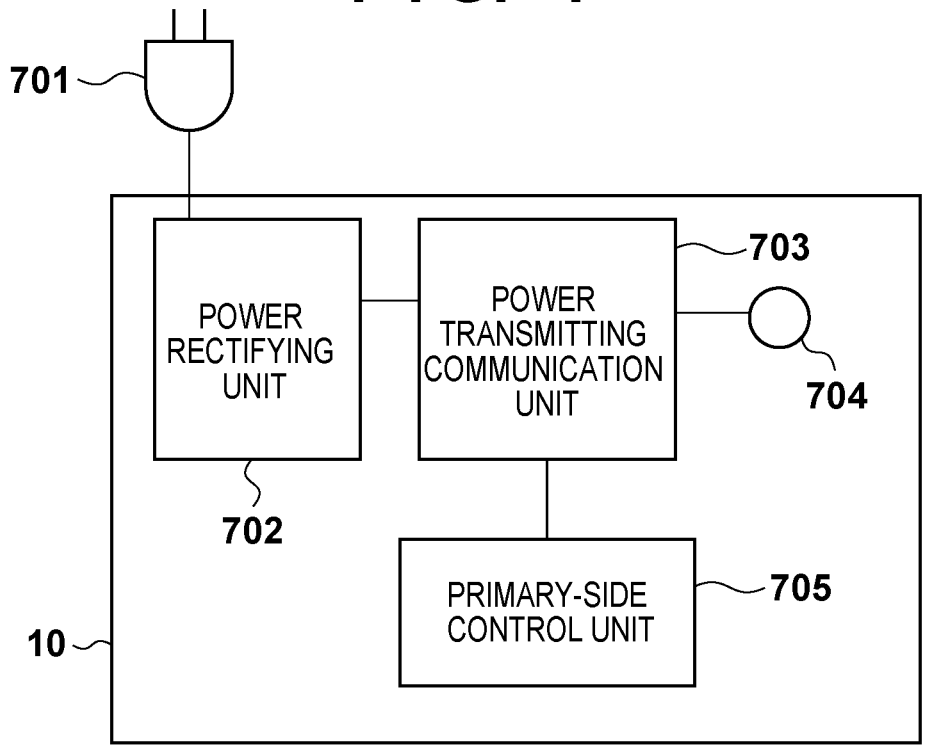
FIG. 7 is a block diagram showing the arrangement of a primary-side apparatus according to the second embodiment.

The arrangement of a primary-side apparatus 10 according to the second embodiment will be described below with reference to FIG. 7. The primary-side apparatus 10 includes a power plug 701, power rectifying unit 702, power transmitting communication unit 703, primary-side coil/antenna 704, and primary-side control unit 705. The power plug 701 is that which is connected to an outlet of an AC power supply. The power rectifying unit 702 rectifies electricity supplied from the power plug 701. The power transmitting communication unit 703 transmits the electricity rectified by the power rectifying unit 702 to a secondary-side apparatus, and also makes a data communication. The primary-side coil/antenna 704 is that for the power transmitting communication unit 703. The primary-side control unit 705 controls the power transmitting communication unit 703.

Figure 8:
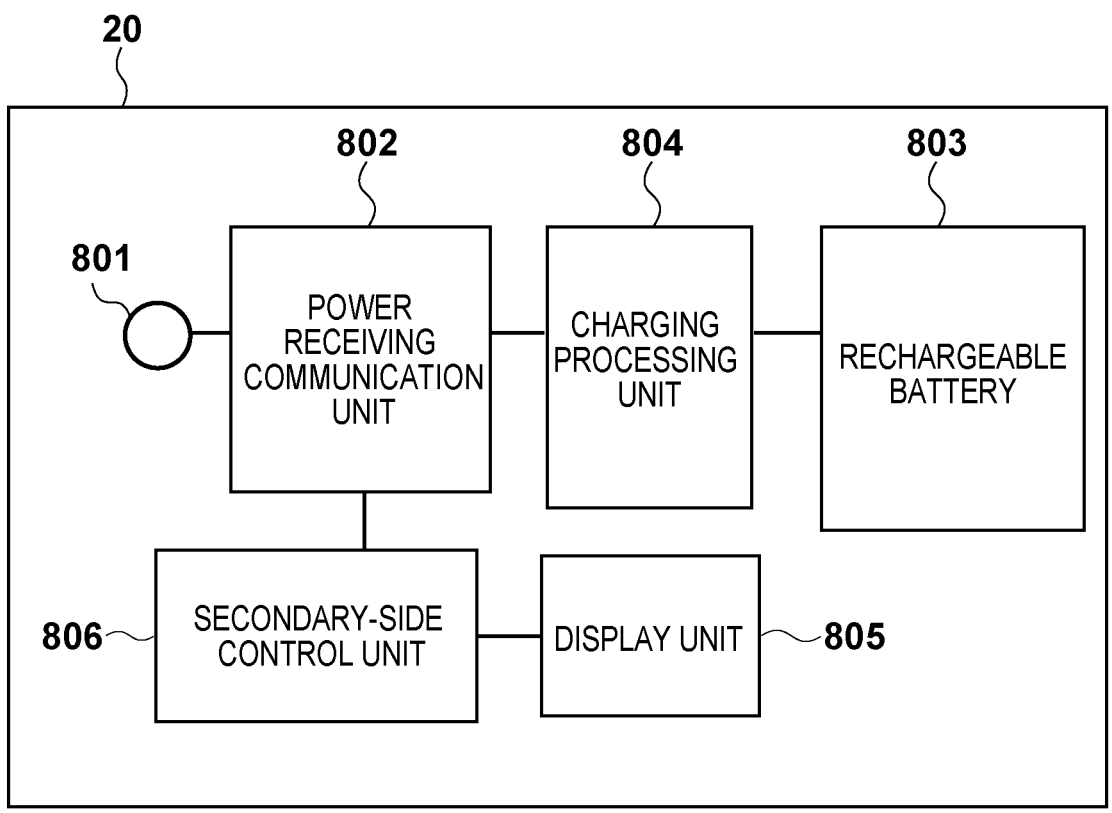
FIG. 8 is a block diagram showing the arrangement of a secondary-side apparatus according to the second embodiment.

The arrangement of a secondary-side apparatus 20 will be described below with reference to FIG. 8. The secondary-side apparatus 20 includes a secondary-side coil/antenna 801, power receiving communication unit 802, rechargeable battery 803, charging processing unit 804, display unit 805, and secondary-side control unit 806. Note that the arrangement of a secondary-side apparatus 30 is the same as that of the secondary-side apparatus 20.

Figure 9:
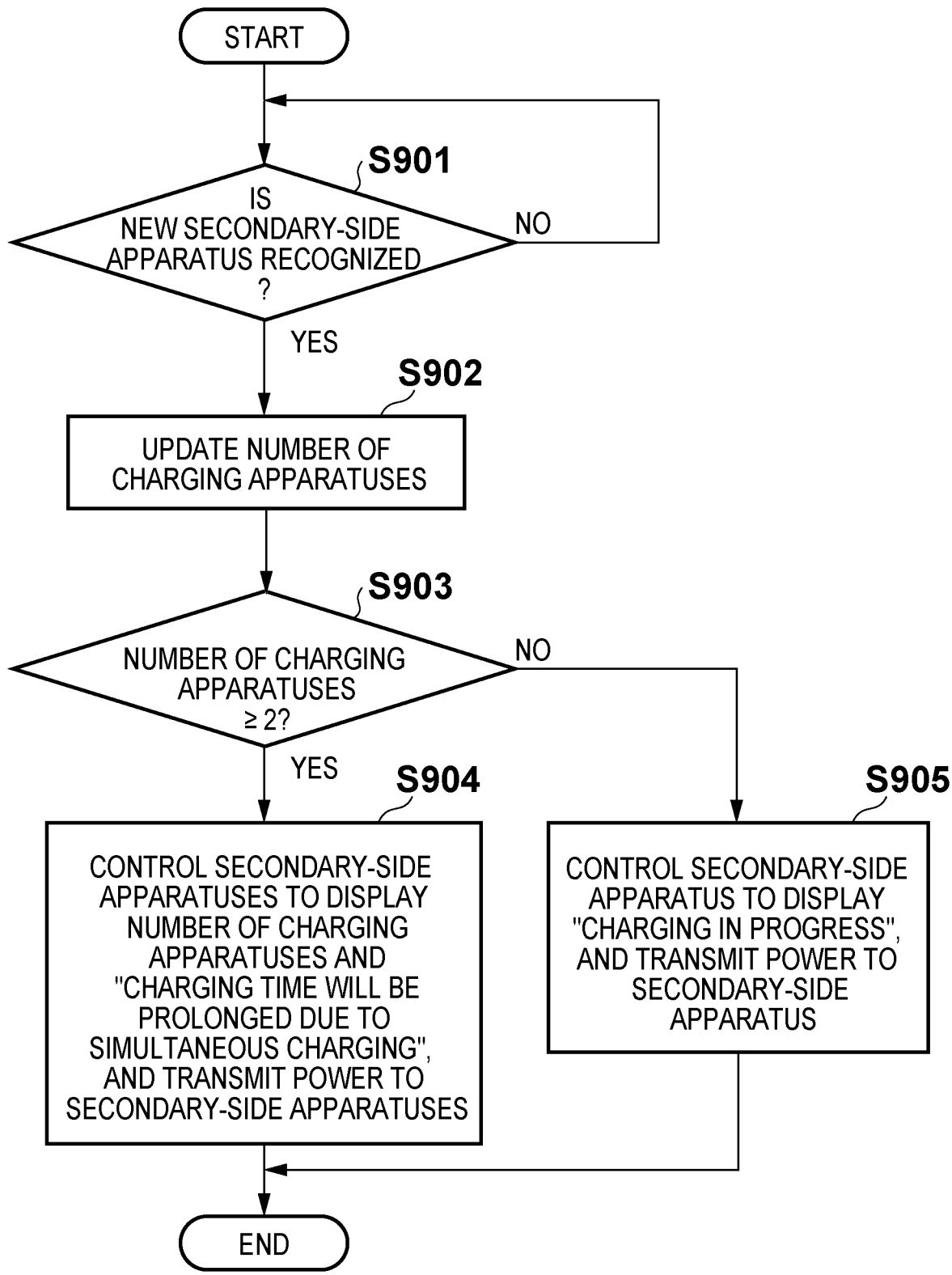
FIG. 9 is a flowchart for explaining processing of a primary-side control unit in association with charging according to the second embodiment.

The secondary-side coil/antenna 801 is that which receives the electricity and predetermined information transmitted from the primary-side coil/antenna 704. The power receiving communication unit 802 receives the electricity transmitted from the secondary-side coil/antenna 801, and also makes a data communication. The rechargeable battery 803 is that to be charged. The charging processing unit 804 supplies the electricity received by the power receiving communication unit 802 to the rechargeable battery 803. The display unit 805 displays information. The secondary-side control unit 806 controls the power receiving communication unit 802 and display unit 805. The operation of the primary-side control unit 705 in association with charging by this charging system will be described below with reference to the flowchart shown in FIG. 9.

The primary-side control unit 705 determines in step S901 whether or not a new secondary-side apparatus is recognized. If it is determined that a new secondary-side apparatus is recognized (step S901; YES), the process advances to step S902. On the other hand, if it is determined that a new secondary-side apparatus is not recognized (step S901; NO), the process returns to step S901.

In step S902, the primary-side control unit 705 updates the number of charging secondary-side apparatuses.

In the example shown in FIG. 1, the number of charging apparatuses is 1.

Next, the primary-side control unit 705 determines in step S903 whether or not the number of charging apparatuses is 2 or more. If it is determined that the number of charging apparatuses is 2 or more (step S903; YES), the process advances to step S904. On the other hand, if it is determined that the number of charging apparatuses is less than 2 (step S903; NO), the process advances to step S905.

In step S904, the primary-side control unit 705 controls the power transmitting communication unit 703 to transmit predetermined information to the secondary-side apparatus via the primary-side coil/antenna 704. Then, in the secondary-side apparatus, the secondary-side control unit 806 controls the power receiving communication unit 802 to receive the predetermined information transmitted from the primary-side apparatus 10 via the secondary-side coil/antenna 801.

Also, the primary-side control unit 705 controls the power transmitting communication unit 703 to transmit power to the secondary-side apparatus via the primary-side coil/antenna 704. When power is transmitted from the primary-side apparatus 10 to the secondary-side apparatus, the power receiving communication unit 802 receives the power via the secondary-side coil/antenna 801. Then, the charging processing unit 804 accumulates the received electricity in the rechargeable battery 803. The secondary-side control unit 806 controls the display unit 805 to display information indicating the number of charging apparatuses, and information indicating that a charging time will be prolonged due to simultaneous charging.

In step S905, the primary-side control unit 705 controls the power transmitting communication unit 703 to transmit predetermined information to the secondary-side apparatus via the primary-side coil/antenna 704. Also, the primary-side control unit 705 controls the power transmitting communication unit 703 to transmit power to the secondary-side apparatus via the primary-side coil/antenna 704. Then, in the secondary-side apparatus, the secondary-side control unit 806 controls the power receiving communication unit 802 to receive, via the secondary-side coil/antenna 801, the predetermined information transmitted from the primary-side apparatus 10. When power is transmitted from the primary-side apparatus 10 to the secondary-side apparatus, the power receiving communication unit 802 receives the power via the secondary-side coil/antenna 801. Then, the secondary-side control unit 806 controls the display unit 805 to display information indicating that charging is in progress.

Figure 10:
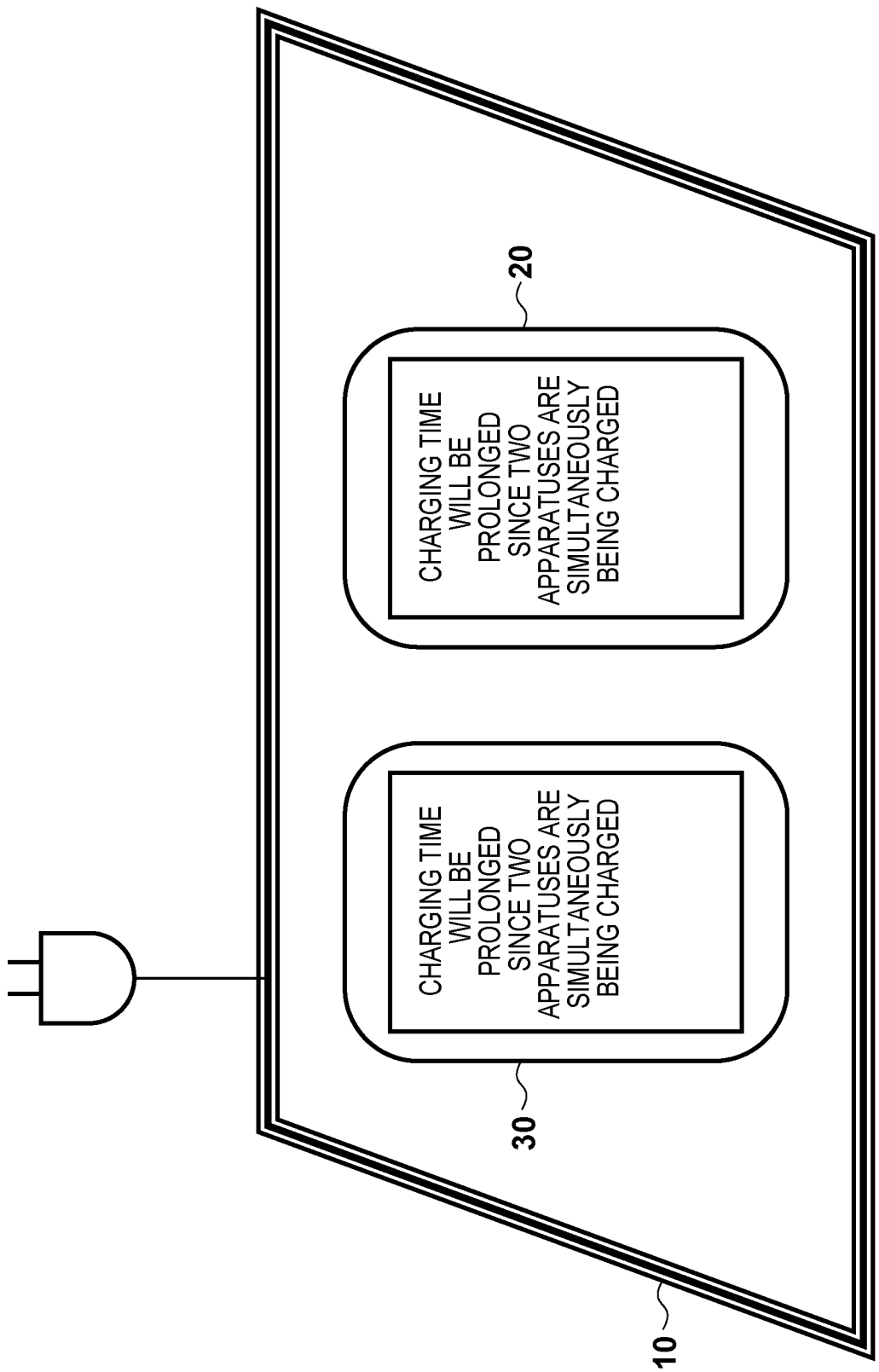
FIG. 10 is a view showing output contents according to the second embodiment.

In this way, the processing ends. As shown in FIG. 5, when the secondary-side apparatus 20 alone is placed on a chargeable region of the primary-side apparatus 10, information indicating that charging is in progress is displayed on the secondary-side apparatus 20, and the secondary-side apparatus 20 is charged. From this state, when the secondary-side apparatus 30 is placed on the chargeable region of the primary-side apparatus 10, information indicating that the charging time will be prolonged since two apparatuses are simultaneously being charged is displayed on the secondary-side apparatuses 20 and 30, as shown in FIG. 10. Note that an estimated time required until completion of charging may be further displayed.

According to this embodiment, the users of the secondary-side apparatuses 20 and 30 can know the number of a plurality of secondary-side apparatuses which are being charged simultaneously and information indicating that the charging time will be prolonged, thus improving the convenience.

Third Embodiment

The configuration of a charging system according to the third embodiment is the same as that shown in FIG. 1 described in the first embodiment. Also, the arrangement of a secondary-side apparatus according to the third embodiment is the same as that shown in FIG. 3 described in the first embodiment.

Figure 11:
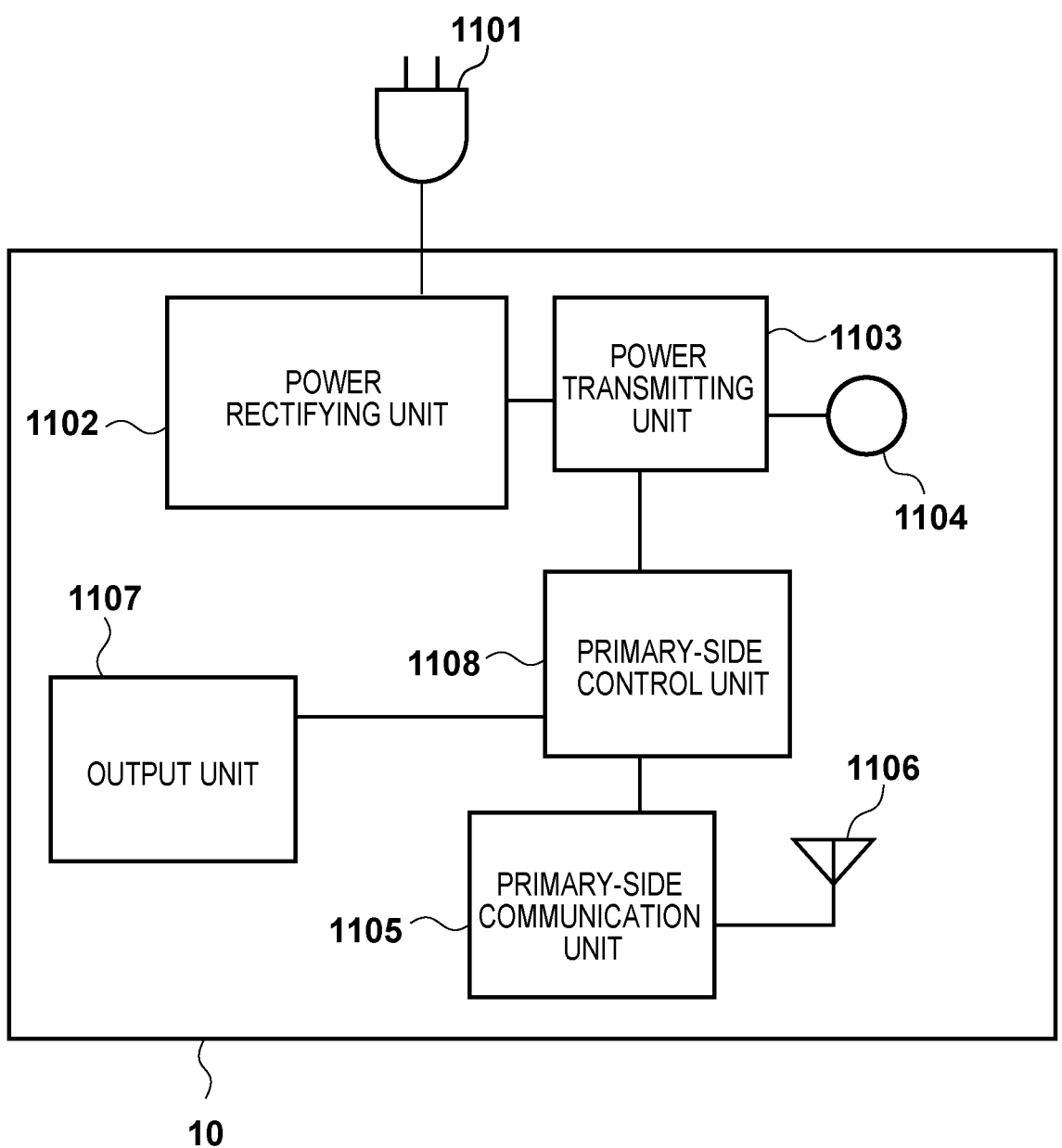
FIG. 11 is a block diagram showing the arrangement of a primary-side apparatus according to the third embodiment.

The arrangement of a primary-side apparatus 10 according to the third embodiment will be described below with reference to FIG. 11. The primary-side apparatus 10 includes a power plug 1101, power rectifying unit 1102, power transmitting unit 1103, primary-side coil 1104, primary-side communication unit 1105, primary-side antenna 1106, output unit 1107, and primary-side control unit 1108.

The power plug 1101 is that which is connected to an outlet of an AC power supply. The power rectifying unit 1102 rectifies electricity supplied from the power plug 1101. The power transmitting unit 1103 transmits the electricity rectified by the power rectifying unit 1102. The primary-side coil 1104 is that for the power transmitting unit 1103. The primary-side communication unit 1105 makes a data communication. The primary-side antenna 1106 is that for the primary-side communication unit 1105. The output unit 1107 outputs information. The primary-side control unit 1108 controls the power transmitting unit 1103, primary-side communication unit 1105, and output unit 1107.

Figure 12:
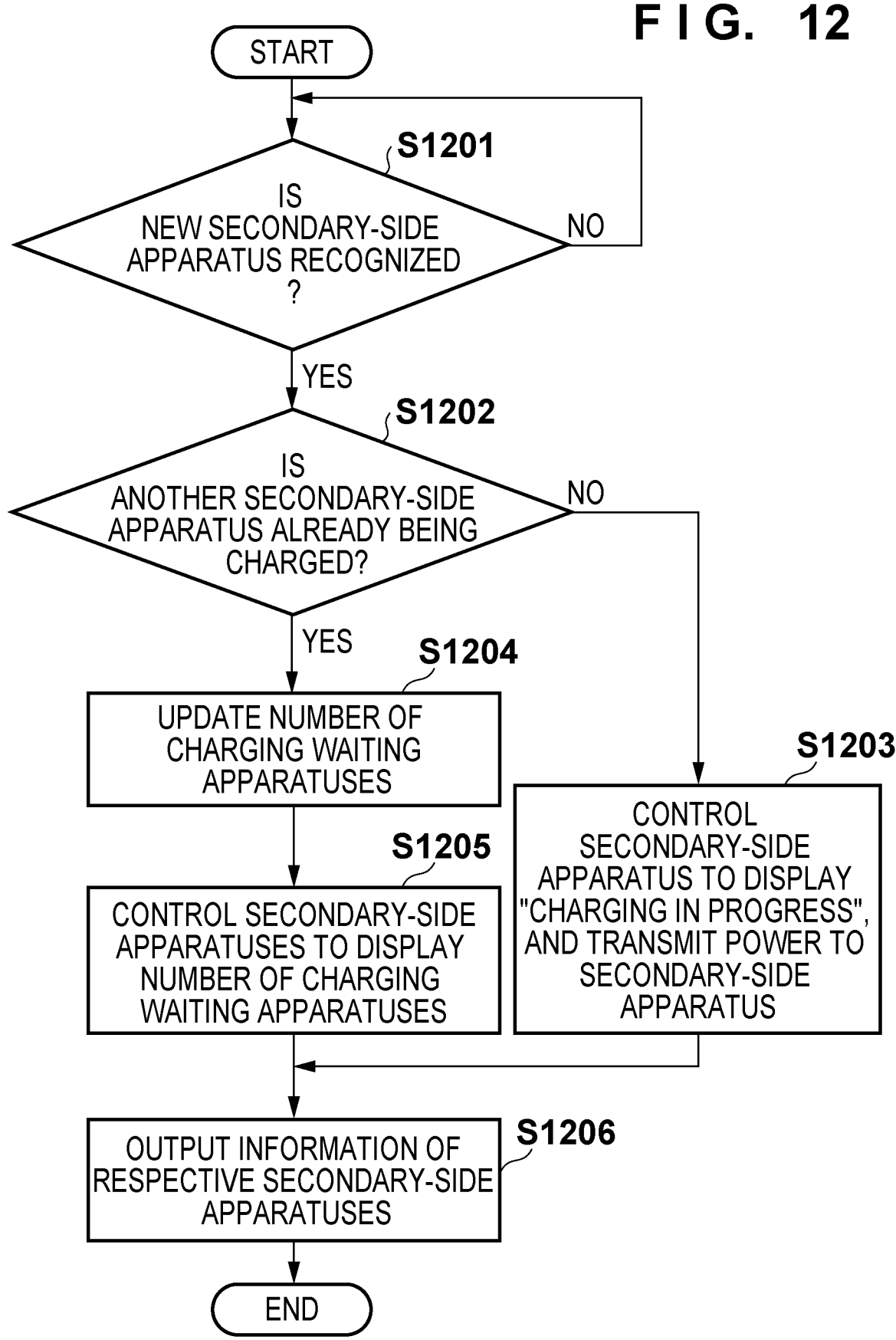
FIG. 12 is a flowchart for explaining processing of a primary-side control unit in association with charging according to the third embodiment.

The operation of the primary-side control unit 1108 in association with charging by this charging system will be described below with reference to the flowchart of FIG. 12. The primary-side control unit 1108 determines in step S1201 whether or not a new secondary-side apparatus is recognized. If it is determined that a new secondary-side apparatus is recognized (step S1201; YES), the process advances to step S1202. On the other hand, if it is determined that a new secondary-side apparatus is not recognized (step S1201; NO), the process returns to step S1201.

The primary-side control unit 1108 determines in step S1202 whether or not there is another secondary-side apparatus which is already being charged. If it is determined that there is the other secondary-side apparatus which is already being charged (step S1202; YES), the process advances to step S1204. On the other hand, if it is determined there is no secondary-side apparatus which is already being charged (step S1202; NO), the process advances to step S1203.

In step S1203, the primary-side control unit 1108 controls the primary-side communication unit 1105 to transmit predetermined information to the secondary-side apparatus via the primary-side antenna 1106. The primary-side control unit 1108 controls the power transmitting unit 1103 to transmit power to the secondary-side apparatus via the primary-side coil 1104. Then, in the secondary-side apparatus, a secondary-side control unit 208 controls a secondary-side communication unit 205 to receive, via a secondary-side antenna 206, the predetermined information transmitted from the primary-side apparatus 10. When power is transmitted from the primary-side apparatus 10 to the secondary-side apparatus, a power receiving unit 202 receives power via a secondary-side coil 201. Then, a charging processing unit 204 accumulates the received electricity in a rechargeable battery 203. The secondary-side control unit 208 controls a display unit 207 to display information indicating that charging is in progress. Upon completion of the processing in step S1203, the process advances to step S1206.

In step S1204, the primary-side control unit 1108 updates the number of charging waiting apparatuses.

In step S1205, the primary-side control unit 1108 controls the primary-side communication unit 1105 to transmit predetermined information to the secondary-side apparatus via the primary-side antenna 1106. In the secondary-side apparatus, the secondary-side control unit 208 controls the secondary-side communication unit 205 to receive, via the secondary-side antenna 206, the predetermined information transmitted from the primary-side apparatus 10. Then, the secondary-side control unit 208 controls the display unit 207 to display information indicating the number of charging waiting apparatuses.

In step S1206, the primary-side control unit 1108 controls the output unit 1107 to output pieces of information of the respective secondary-side apparatuses (second display processing).

In this way, the processing ends.

Figure 13:
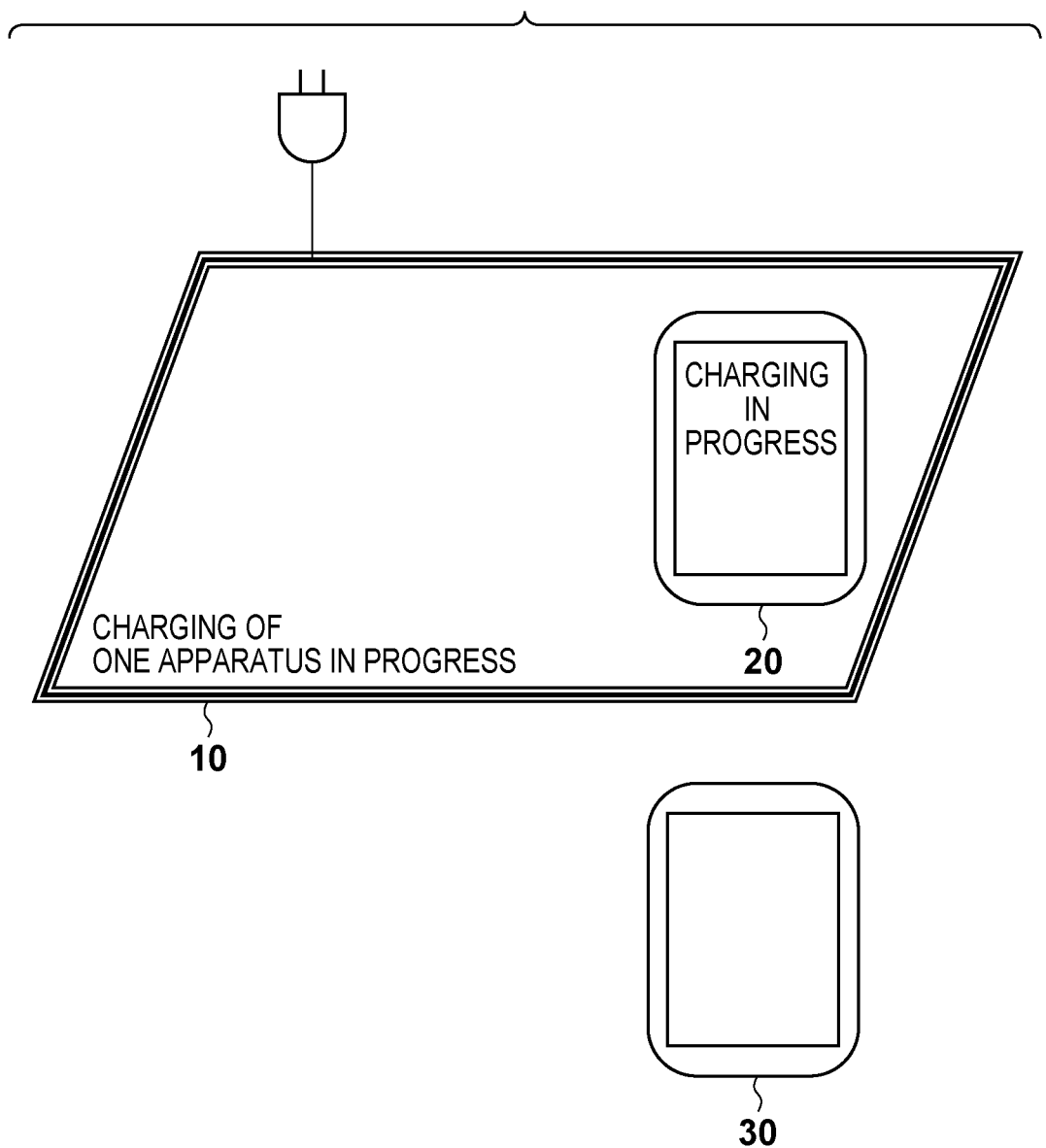
FIG. 13 is a view showing first output contents according to the third embodiment.
Figure 14:
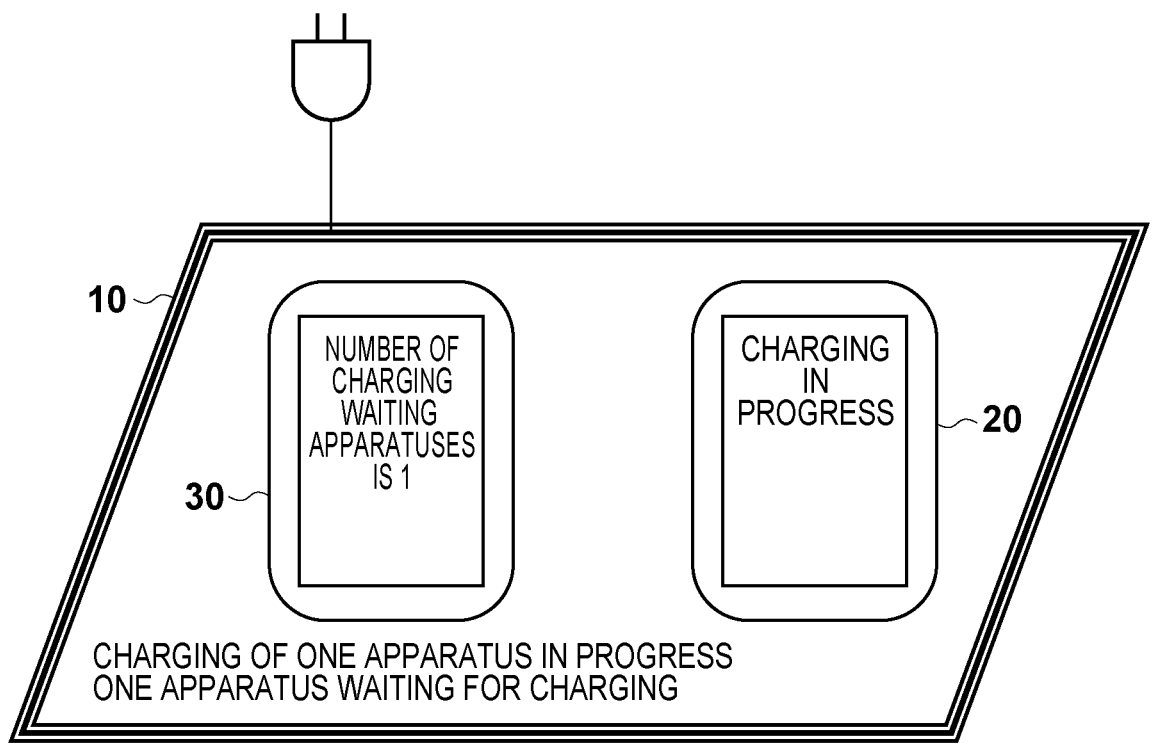
FIG. 14 is a view showing second output contents according to the third embodiment.
Figure 15:
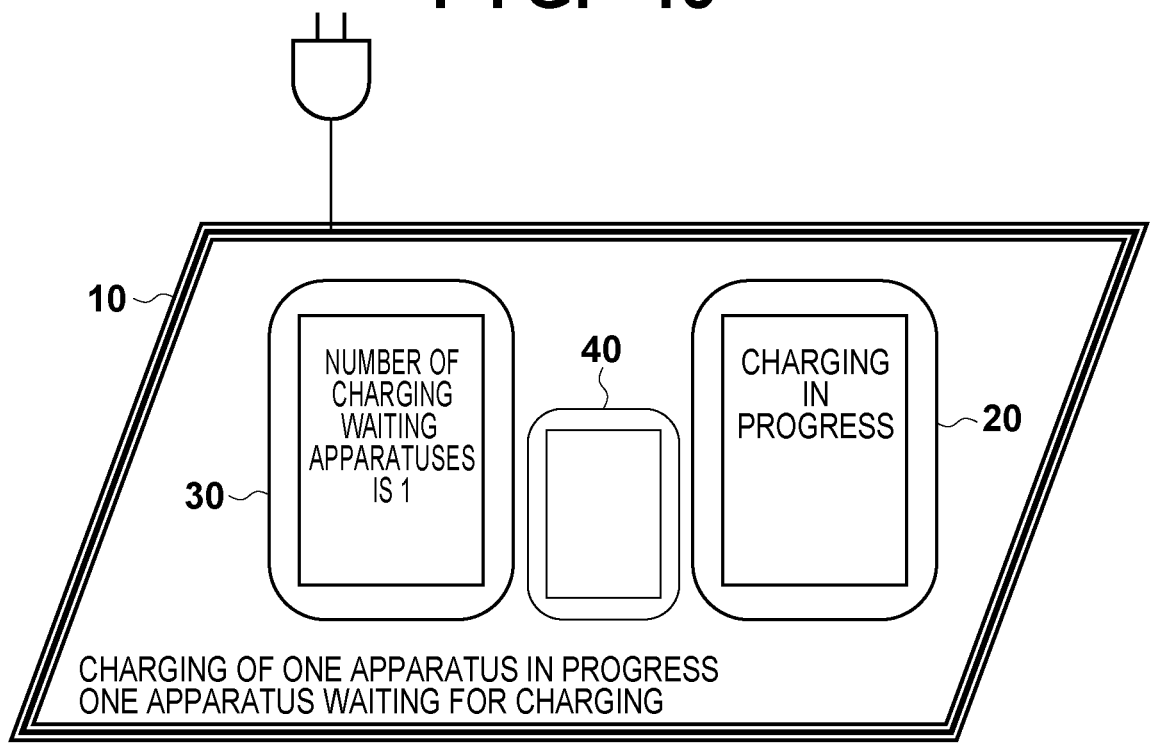
FIG. 15 is a view showing third output contents according to the third embodiment.

With the above processing, as shown in FIG. 13, when a secondary-side apparatus 20 alone is placed on a chargeable region of the primary-side apparatus 10, information indicating that charging is in progress is displayed on the secondary-side apparatus 20, and the secondary-side apparatus 20 is charged. Also, information indicating that charging of one apparatus is in progress is displayed on the primary-side apparatus 10. From this state, when a secondary-side apparatus 30 is further placed on the chargeable region of the primary-side apparatus 10, information indicating that the apparatus is waiting for charging and information indicating the number of waiting apparatuses is 1 are displayed on the secondary-side apparatus 30, as shown in FIG. 14. Furthermore, from this state as shown in FIG. 15, when a secondary-side apparatus 40 having a different charging system is placed on the chargeable region of the primary-side apparatus 10, no information is displayed on the secondary-side apparatus 40, and the display contents of the primary-side apparatus remain unchanged.

According to this embodiment, the user of the charging system can recognize charging statuses, thus improving the convenience.

According to the present invention, the user can recognize reasons why a charging time delay phenomenon and a non-charging phenomenon have occurred at the time of wireless power transfer.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-247842 filed on Nov. 4, 2010, which is hereby incorporated by reference herein in its entirety.

What is claimed is:

1. A power transmitting apparatus comprising:
a member configured to mount a power receiving apparatus;
a power transmitting unit configured to wirelessly transmit power to the power receiving apparatus mounted on the member;
a communication unit configured to communicate with the power receiving apparatus mounted on the member; and
a control unit configured to control the power transmitting unit and the communication unit,
wherein the communication unit transmits information to the power receiving apparatus mounted on the member, thereby the power receiving apparatus displays, based on the information transmitted by the communication unit, a charging message representing a charging speed.

2. The apparatus according to claim 1, wherein the information transmitted by the communication unit comprises information that is to be used when the power receiving apparatus selects a charging message among a plurality of charging messages representing a charging speed, that include a first charging message representing a charging speed and a second charging message representing a charging speed lower than the charging speed represented by the first charging message and displays the charging message selected.

3. The apparatus according to claim 2, wherein the information transmitted by the communication unit comprises information that is to be used when the power receiving apparatus selects the first charging message and displays the first charging message, in a case where the power transmitting apparatus is not transmitting power to another power receiving apparatus different from the power receiving apparatus.

4. The apparatus according to claim 2, wherein the information transmitted by the communication unit comprises information that is to be used when the power receiving apparatus selects the second charging message and displays the second charging message, in a case where the power transmitting apparatus is transmitting power to another power receiving apparatus different from the power receiving apparatus.

5. The apparatus according to claim 2, wherein the first charging message represents that a normal charging is being performed.

6. The apparatus according to claim 2, wherein the second charging message represents that a charging time is to be longer than a normal charging.

7. The apparatus according to claim 2, wherein the second charging message represents that a charging time is to be prolonged because a plurality of apparatuses are performing charging.

8. The apparatus according to claim 1, wherein the communication unit transmits the information via an antenna used to wirelessly transmitting power by the power transmitting unit.

9. A method for controlling a power transmitting apparatus comprising a member configured to mount a power receiving apparatus and a power transmitting unit configured to wirelessly transmit power to the power receiving apparatus mounted on the member, the method comprising:
wirelessly transmitting power to the power receiving apparatus mounted on the member by the power transmitting unit; and
communicating with the power receiving apparatus mounted on the member,
wherein, in the communicating, transmitting information to the power receiving apparatus mounted on the member, thereby the power receiving apparatus displays, based on the information transmitted by the communication unit, a charging message representing a charging speed.

10. The method according to claim 9, wherein the transmitted information comprises information that is to be used when the power receiving apparatus selects a charging message among a plurality of charging messages representing a charging speed, that include a first charging message representing a charging speed and a second charging message representing a charging speed lower than the charging speed represented by the first charging message and displays the charging message selected.

11. The method according to claim 10, wherein the transmitted information comprises information that is to be used when the power receiving apparatus selects the first charging message and displays the first charging message, in a case where the power transmitting apparatus is not transmitting power to another power receiving apparatus different from the power receiving apparatus.

12. The method according to claim 10, wherein the transmitted information comprises information that is to be used when the power receiving apparatus selects the second charging message and displays the second charging message, in a case where the power transmitting apparatus is transmitting power to another power receiving apparatus different from the power receiving apparatus.

13. The method according to claim 10, wherein the first charging message represents that a normal charging is being performed.

14. The method according to claim 10, wherein the second charging message represents that a charging time is to be longer than a normal charging.

15. The method according to claim 10, wherein the second charging message represents that a charging time is to be prolonged because a plurality of apparatuses are performing charging.

16. A non-transitory computer-readable storage medium storing a computer program for causing a computer to execute a method for controlling a power transmitting apparatus comprising a member configured to mount a power receiving apparatus and a power transmitting unit configured to wirelessly transmit power to the power receiving apparatus mounted on the member, the program comprising code to execute:
- wirelessly transmitting power to the power receiving apparatus mounted on the member by the power transmitting unit; and
- communicating with the power receiving apparatus mounted on the member,
- wherein, in communicating, transmitting information to the power receiving apparatus mounted on the member, thereby the power receiving apparatus displays, based on the information transmitted by the communication unit, a charging message representing a charging speed.

* * * * *